United States Patent
Imai

[11] Patent Number: 5,912,781
[45] Date of Patent: *Jun. 15, 1999

[54] TAPE SPEED CONTROL METHOD AND A TAPE UNIT EQUIPPED WITH THE CONTROL METHOD

[75] Inventor: Toshiaki Imai, Chiba, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/767,335

[22] Filed: Dec. 16, 1996

[30] Foreign Application Priority Data

Dec. 18, 1995 [JP] Japan .................. 7-328664

[51] Int. Cl.$^6$ ............................... G11B 15/16
[52] U.S. Cl. ........................ 360/73.14; 360/73.04; 360/73.08; 360/73.05
[58] Field of Search ............... 360/73.03, 73.05, 360/73.08, 73.09, 74.1, 73.14

[56] References Cited

U.S. PATENT DOCUMENTS

| | | | |
|---|---|---|---|
| 4,514,672 | 4/1985 | O'Gwynn | 360/73.14 |
| 4,525,654 | 6/1985 | Tajima et al. | 360/73.14 |
| 4,664,336 | 5/1987 | Koyama | 360/73.14 |
| 4,996,611 | 2/1991 | Ito | 360/137 |
| 5,222,684 | 6/1993 | Yoneda et al. | 360/73.05 |
| 5,259,563 | 11/1993 | Kakiwaki et al. | 360/73.09 |
| 5,275,351 | 1/1994 | Wu et al. | 360/73.05 |
| 5,400,980 | 3/1995 | Yoshikawa | 360/73.14 |

FOREIGN PATENT DOCUMENTS

| | | |
|---|---|---|
| 0503105 | 9/1992 | European Pat. Off. . |
| 0506169 | 9/1992 | European Pat. Off. . |
| 0532238 | 3/1993 | European Pat. Off. . |

*Primary Examiner*—Nabil Hindi
*Attorney, Agent, or Firm*—Jay H. Maioli

[57] ABSTRACT

A changing rate of the ratio of the respective winding radii of the magnetic tape wound around the supply reel and the take-up reel at the same time is detected and used to control the stopping of the tape. When the changing rate exceeds a predetermined value, it is determined that the magnetic tape is short. Then, the transport speed is reduced to a speed which permits the tape to be stopped quickly.

2 Claims, 4 Drawing Sheets

Top $r_s/r_t < 1$

Middle $r_s/r_t \doteq 1$

End $r_s/r_t < 1$

TAPE SPEED CONTROL METHOD AND A TAPE UNIT EQUIPPED WITH THE CONTROL METHOD

BACKGROUND OF THE INVENTION

1. Field of the Invention

The present invention relates to a method for controlling a speed at which a wound tape is transported and a tape unit equipped with the control method, and more particularly to a method for controlling a transport speed of a tape wound around a pair of reels for use in a video tape recorder (hereinafter referred to as a VTR), a cassette deck or the like and a tape unit equipped with the control method.

2. Description of the Related Art

A magnetic tape for use in a VTR or the like is arranged such that its both ends are fixed to a supply reel and a take-up reel, respectively, and its middle portion serves as a magnetized surface which can be magnetized in accordance with a recording signal. The magnetized surface contacts to a magnetic head disposed between the supply reel and the take-up reel so that the magnetic head reads information recorded on the magnetic tape, and transfers the information to predetermined electric circuits.

When a reel hub of the supply reel or a reel hub of the take-up reel is driven by a capstan motor, the supply reel and the take-up reel are rotated in the same direction. Therefore, the magnetic tape is transported while contacting to the magnetic head. An operation in which the tape is unreeled from the supply reel and taken up by the take-up reel is called a feeding operation (F) while an operation in which the tape is rewound from the take-up reel side to the supply reel side is called a reverse (REV) operation.

When reproduction or recording is carried out, the magnetic tape is transported at a normal speed. But in order for a user to find a desired recording position of the magnetic tape and bring the position in front of the magnetic tape swiftly, there are provided functions of a fast forward (FF) and a rewinding (REW) in which the magnetic tape is transported at a high speed.

In a recently developed VTR, in order to reduce a waiting time of the user, a microcomputer is introduced for controlling the revolution rate of the capstan motor which is utilized for transporting the magnetic tape at a high rate in the fast forward (FF) and the rewinding (REW) modes.

When the magnetic tape is transported at a high speed, how to stop the tape must be considered. For example, when the rewinding mode is operated, the magnetic tape is rewound up to its terminal end. Therefore, if speed reduction starts too late near the terminal end, the terminal end of the magnetic tape passes over the magnetic head and a leader tape can be exposed. In the worst case, the reel is still rotated after the leader tape has been completely rewound. As a result, the magnetic tape and the leader tape can be cut or split at a bonding portion between the magnetic tape and the leader tape or at a bonding portion of the leader tape and the reel hub.

Nowadays, as a method for halting the magnetic tape transported at a high speed, there is proposed a method in which a ratio of the radii of the supply reel and the take-up reel around which the magnetic tape is wound is checked so that an amount of magnetic tape wound around each of the supply reel and the take-up reel is determined. Specifically, the magnetic tape is transported at a high speed until the radius of the magnetic tape around the supply reel becomes equal to the radius of the magnetic tape around the take-up reel, and thereafter the speed is reduced to a speed which permits the tape to be stopped quickly, whereby the magnetic tape is protected from being damaged.

Further, if a relatively short magnetic tape is to be controlled in its transportation speed in the fast forward or the rewinding modes, there has been known a technique as follows. That is, after the magnetic tape is loaded, when the fast forward or the rewinding is started, a pinch roller is pressed against the magnetic tape to measure an area of the magnetic tape, i.e., a radius of the roll of the magnetic tape, and then a length of the magnetic tape is determined on the basis of the measured result, and the magnetic tape is controlled at its transportation speed based on the length thus determined.

However, the method for controlling the speed of the magnetic tape by checking the ratio of radii of the tape rolls on the supply reel and the take-up reel involves the following drawbacks. Specifically, if a tape transported at a high speed is a magnetic tape with an extremely short length such as a tape for use in a compact cassette tape (hereinafter referred to as a C cassette) of a video home system (hereinafter referred to as a VHS) or a cut special magnetic tape, for example, the timing for effecting the speed reduction in accordance with the check of the ratio of radii of the tape rolls to the supply reel and the take-up reel, tends to be late, causing damage to the tape.

Further, the method in which a pinch roller is pressed against the magnetic tape to control the speed of the tape involves the following drawbacks. That is, if the magnetic tape is set to carry out the FF/REW mode under condition that information concerning the length of the magnetic tape is not available, then the pinch roller should be pressed against the magnetic tape for measuring the length of the magnetic tape prior to setting the high-speed transportation mode. For this reason, it is necessary to carry out an operation for pressing the pinch roller against the magnetic tape, which fact causes problems of a loss time upon starting the FF/REW operation and a sense of incongruity in operation.

Further, it is unavoidable for the microcomputer to require a finite calculation time and also it is necessary for a read only memory (hereinafter referred to as ROM) to have a large capacity for calculating the cross-sectional area of the magnetic tape roll, storing a table for memorizing the measured result, calculating the remaining amount of the magnetic tape and so on. Therefore, the control method itself involves an essential problem.

SUMMARY OF THE INVENTION

Therefore, it is a general object of the present invention to provide an improved tape speed control method and a tape unit employing the tape speed control method in which aforesaid shortcomings and disadvantages encountered with the prior art can be eliminated.

More specifically, it is an object of the present invention to provide a tape speed control method and a tape unit employing the method in which the tape transport speed is properly controlled without retarding the speed reduction timing regardless of the tape length, whereby the tape can be protected from being damaged.

According to an aspect of the present invention, there is provided a tape speed control method for controlling speed of a tape wound around a pair of tape reels, wherein when one of the tape reels rotates to transport the tape, a winding radius is calculated from the revolution rate of the other tape reel which is dependently rotated by the transported tape, and the rotative drive is controlled on the basis of the winding radius.

According to another aspect of the present invention, there is provided a tape unit including a pair of tape reels, a tape wound around the tape reels, rotative drive means for rotatively driving the tape reels, a detecting means for detecting a revolution rate of the tape reels, and a control means for calculating the wounding radius from the revolution rate of the tape reel and controlling the rotative drive means on the basis of the winding radius, wherein when the one tape reel rotates to transport the tape, the control means calculates the winding radius from the revolution rate of the other tape reel which is dependently rotated by the transported tape, and controls the rotative drive on the basis of the winding radius.

According to the present invention, the tape reels are controlled in their rotative drive on the basis of the revolution rate of the other tape reel which is dependently rotated by the tape transported by the one tape reel. Therefore, even if the tape wound around the reels is short, the tape remaining amount of the tape wound around the dependently rotated reel can be swiftly detected by the revolution of the reel, and the speed reduction control can be effected without retardation even though the tape is short. Therefore, the tape can be protected from being damaged.

Further, according to the present invention, when the revolution rate of the tape reel dependently rotated by the tape exceeds the predetermined velocity and/or when the changing amount of the revolution rate during the predetermined period of time exceeds the predetermined value, the rotative drive is reduced. Therefore, even if the tape reel is started to be rotated at a high speed, the terminal end of the tape can be detected swiftly and positively. Accordingly, the tape can be protected from being damaged.

The above and other objects, features and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

A tape speed control method and a tape unit including an arrangement effecting the tape speed control method according to the present invention will hereinafter be described in detail with reference to the drawings.

Figure 1:
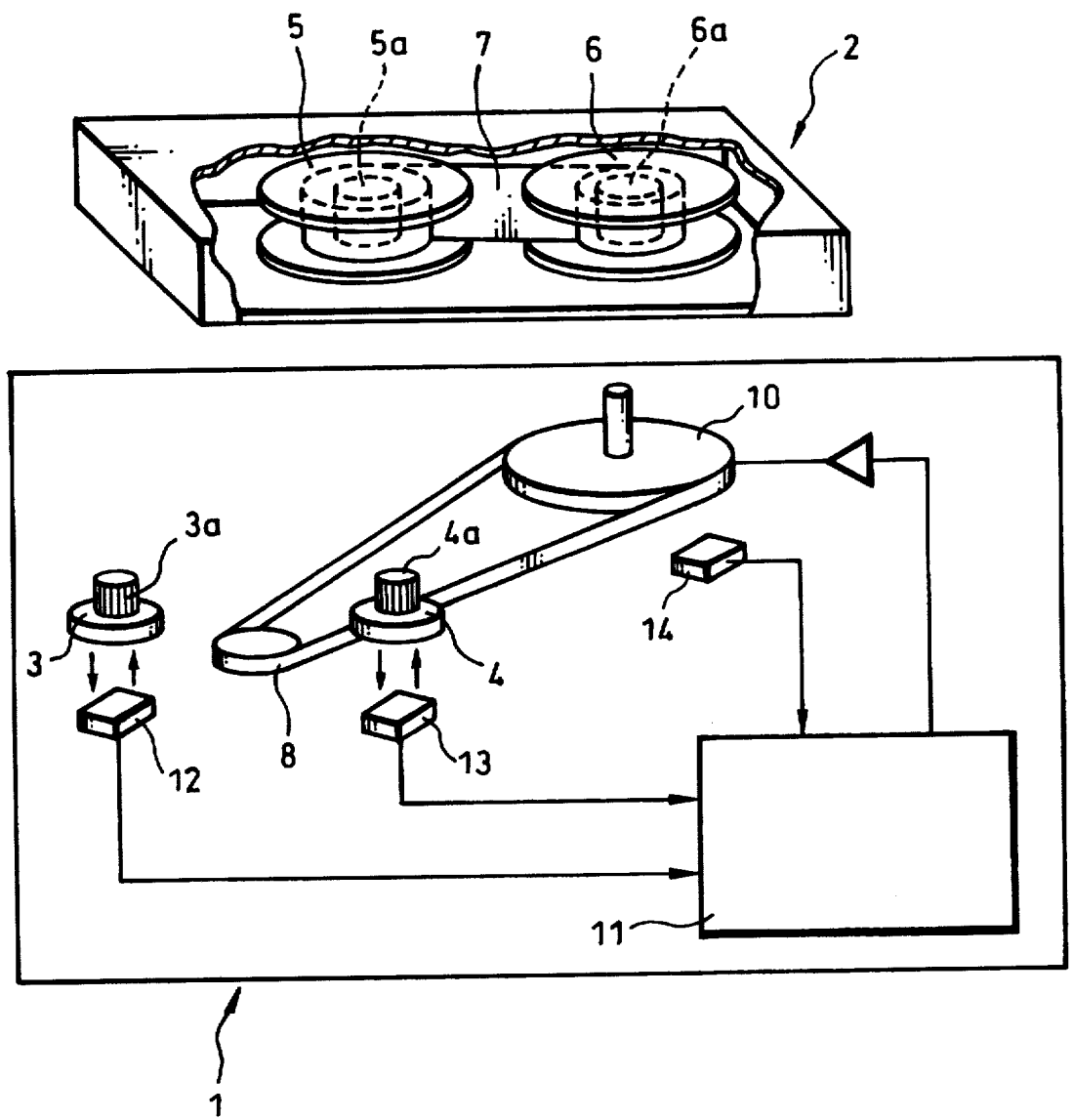
FIG. 1 is a diagram schematically showing an arrangement of a tape unit according to an embodiment of the present invention.

FIG. 1 shows a state in which a tape cassette 2 is to be inserted into a VTR body 1 as a tape unit including an arrangement effecting the tape speed control method according to the present invention. The VTR body 1 is provided with a pair of reel stands 3, 4, a capstan 8, a capstan motor 10 and a microcomputer 11.

The pair of reel stands 3, 4 and the capstan 8 are arranged to be rotated by drive of the capstan motor 10 in accordance with modes of recording, playback, fast forward (FF), rewinding (REW) and so on. For example, if the mode of recording or playback is set, then the capstan 8 is rotated while the reel stand 3 or 4 is controlled in its rotation. If the fast forward mode (FF) is set, the reel stand 4 is controlled to rotate at a high rate while if the rewind mode (REW) is set, the reel stand 3 is controlled to rotate at a high rate. Further, the capstan motor 10 is arranged to be controlled in its speed in response to a signal output from the microcomputer 11.

In addition, the arrangement is further provided with reel sensors 12, 13 for sending a rotation signal indicative of the revolution rate of each of the pair of reel stands 3, 4 to the microcomputer 11 and a FG (Frequency Generator) sensor 14 for sending a rotation signal indicative of the revolution rate of the capstan motor 10 to the microcomputer 11.

On the other hand, in the tape cassette 2, a magnetic tape 7 is fixed at its both ends through leader tapes to a supply reel 5 and a take-up reel 6 on the surfaces of their reel hubs 5a, 6a, respectively, so that the magnetic tape 7 is prevented from being removed from the reels.

If a user inserts the tape cassette 2 into the VTR body 1 having the above structure, reel engaging projections 3a, 4a of the pair of reel stands 3, 4 are engaged with engaging holes of the pair of reel hubs 5a, 6a of the supply reel 5 and the take-up reel 6, respectively. Thus, the tape cassette 2 is loaded onto the VTR body 1.

When the magnetic tape 7 is transported in the mode of fast forward or rewind, the reel sensors 12, 13 count the revolution rates or numbers of the reel stands 3, 4, and send the revolution rates of the supply reel 5 and the take-up reel 6 to the microcomputer 11. The microcomputer 11 detects the revolution rate of the rotatively driving reel and the revolution rate of the tape reel which is dependently rotated by the transported tape. Then, the microcomputer 11 calculates the revolution rate and rotating radii $r_s$, $r_t$ indicative of amounts of the wound magnetic tape 7 on the basis of the detected revolution rates of the respective reels 5, 6. This process will be described in detail later on.

The FG sensor 14 is a sensor for detecting the revolution rate of the capstan motor 10. This FG sensor 14 transmits a detected signal to the microcomputer 11. Thus, the microcomputer 11 can be informed of the transportation velocity of the magnetic tape 7 wound around the tape reels rotatively driven at that time point. As will be described later on, this process serves as a reference for detecting the revolution rates of the reels 5, 6.

Next, a method for controlling the take-up speed of the cassette tape 2 by the VTR body 1 will be described.

Figure 3A:
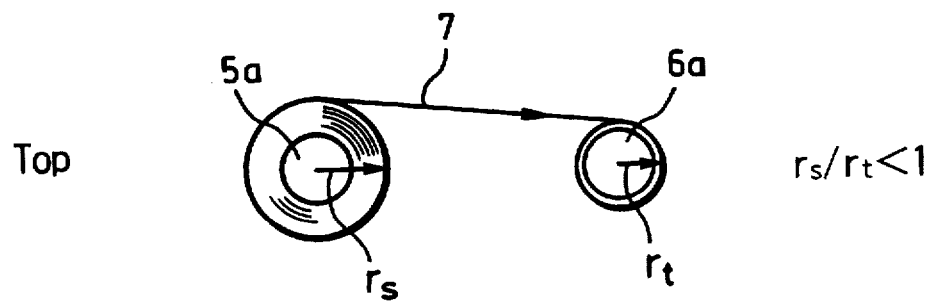
FIG. 3 is a diagram useful for explaining the changing rate of a tape amount on the supply side and a tape amount on the take-up side depending on how much the tape transportation has been done.
Figure 3B:
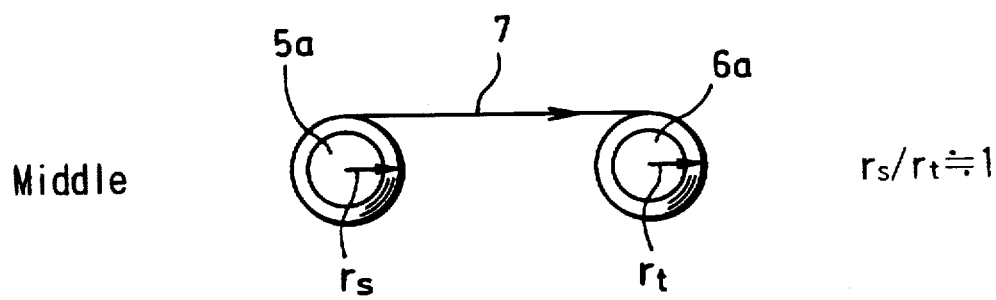
Figure 3C:
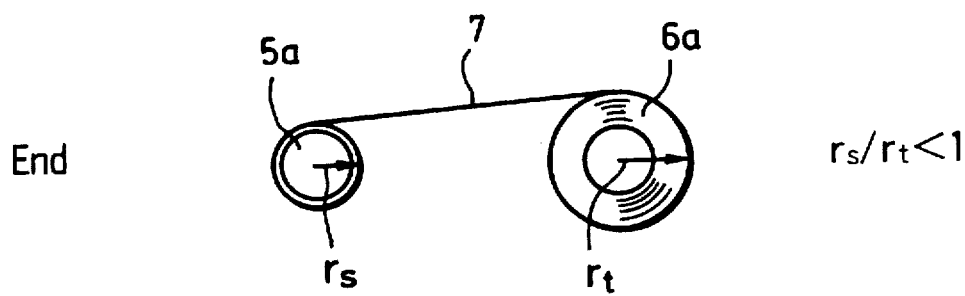

FIGS. 3A through 3C are diagrams useful for explaining a wound state of the magnetic tape 7 around the reel hubs 5a, 6a. The magnetic tape 7 is fixed at its ends to the supply reel hub 5a and the take-up reel hub 6a, respectively. Since the length of the magnetic tape 7 is constant, if the amount of the magnetic tape wound around one reel hub is great, then the amount of the magnetic tape wound around the other reel hub is little.

FIG. 3A shows a state in which the magnetic tape 7 is just started to be transported from the supply reel 5 to the take-up reel 6. At this time, the amount of the magnetic tape 7 wound around the supply reel hub 5a is maximum, and thus the winding radius $r_s$ on the supply side, i.e, the distance from the center of the supply reel hub 5a to the outer periphery including the magnetic tape 7 is greatest. On the other hand, the magnetic tape 7 is not wound around the take-up reel hub 6a. Therefore, the winding radius $r_t$ on the take-up side is equal to the radius of the take-up reel hub 6a, i.e., smallest. The state before the take-up operation is started is referred to as a top state.

FIG. 3B shows a state in which the amount of the magnetic tape 7 wound around the supply reel hub 5a is equal to the amount of the magnetic tape 7 taken up by the take-up reel hub 6a. In this state, the winding radius $r_s$ and the winding radius $r_t$ become equal to each other, and the ratio of the winding radii, $r_s/r_t$ becomes virtually "1". This state is referred to as a middle state.

FIG. 3C shows a state in which the magnetic tape 7 is completely transported from the supply side to the take-up side. In this state, the magnetic tape 7 is not wound around the supply reel hub 5a, and the winding radius $r_s$ becomes smallest and the amount of the magnetic tape 7 wound around the winding reel hub 6a is maximum, and the winding radius $r_t$ becomes greatest. This state is referred to as an end state.

Figure 4:
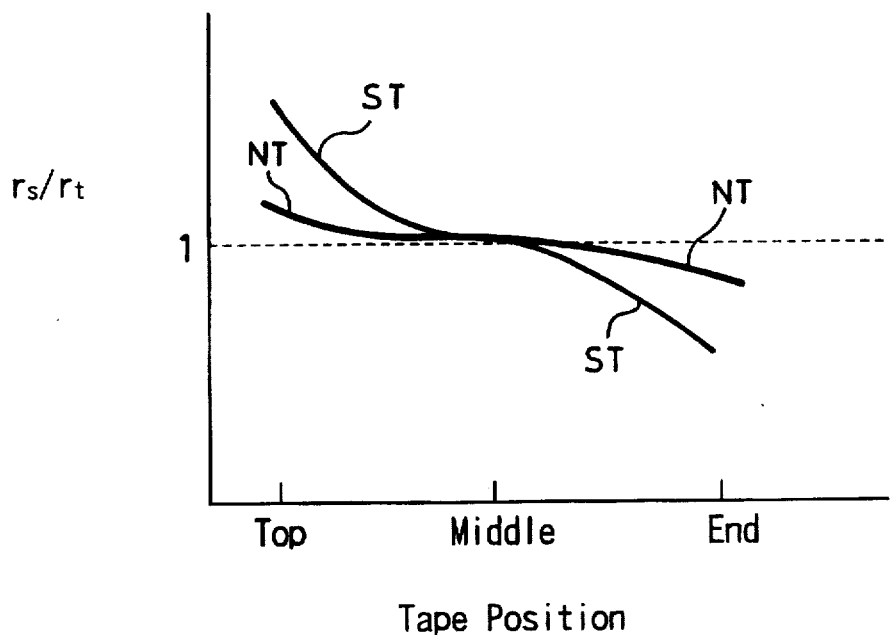
FIG. 4 is a graph showing a change in ratio of the supply side tape winding radius to the take-up side tape winding radius.

FIG. 4 is a graph showing a relation between the amount of the magnetic tape 7 transported from the supply side to the take-up side and the ratio of the winding radii $r_s/r_t$. The ratio of the winding radii $r_s/r_t$ is greater than "1" in a range from the top state to the middle state, "1" at the middle state, and then smaller than "1" in a range from the middle state to the end state. Further, FIG. 5 is a graph showing a relation between the amount of the magnetic tape 7 transported from the supply side to the take-up side and the absolute value of the ratio of the winding radii $r_s/r_t$.

Figure 5:
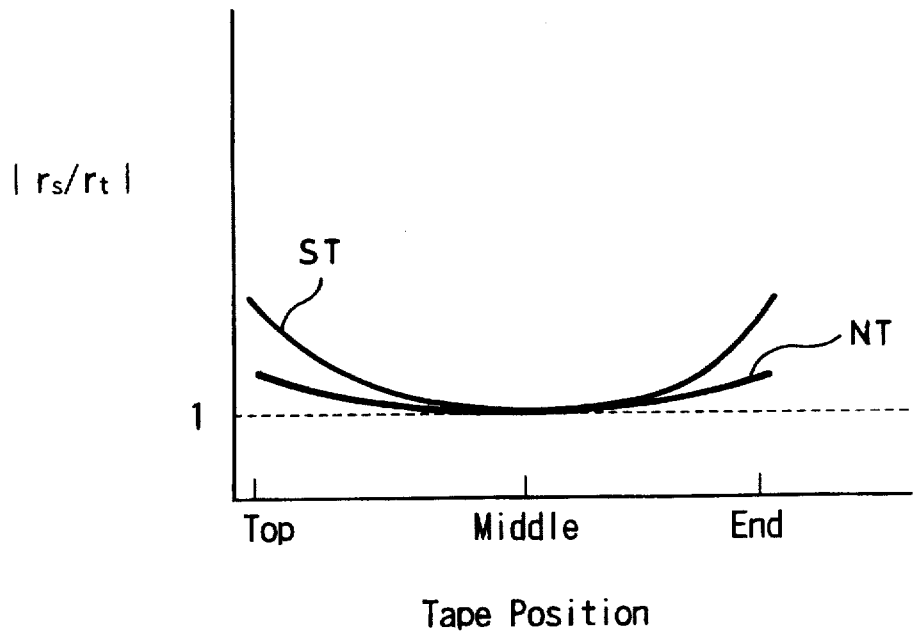
FIG. 5 is a graph showing a change in an absolute value of the ratio of the supply side tape winding radius to the take-up side tape winding radius.

In FIGS. 4 and 5, a curve NT represents a relation between the amount of the transported tape and the ratio of the winding radii $r_s/r_t$ when the magnetic tape 7 has an normal length. On the other hand, a curve ST represents a relation between the amount of the transported tape and the ratio of the winding radii $r_s/r_t$ when the magnetic tape is shorter than an ordinary magnetic tape, such as a magnetic tape for use with a C cassette of a VHS, for example. The winding state of the magnetic tape 7 can be determined by calculating the changing rate at the top state and the end state round the center point at which the ratio becomes $r_s/r_t=1$ (middle state) while comparing the changing rate of the curve ST with that of the curve NT. Therefore, even if the tape wound around the reels is short, the speed reduction control can be properly effected from the end state and the top state.

Further, the shorter the magnetic tape 7 is, the more rapidly the curve ST changes at its winding start end and the winding complete end of the magnetic tape 7 than the curve NT does.

Therefore, the ratio between the winding radius $r_s$ on the supply reel 5 side and the winding radius $r_t$ on the take-up reel 6 side is detected at every turn of the reel, and then the length of the magnetic tape 7 is determined on the basis of the changing rate of the ratio therebetween. Thus, the speed reduction control is carried out based on the determined result in accordance with the length of the magnetic tape 7.

Specifically, for example, when the magnetic tape 7 is transported at a high speed, the ratio of the winding radii $r_s/r_t$ is calculated on the basis of the revolution rate of the supply reel 5 and the revolution rate of the take-up reel 6, and the magnetic tape 7 is transported at the high speed until the ratio of the winding radii $r_s/r_t$ becomes "1". Thereafter, the speed is reduced down to a speed which permits the magnetic tape 7 to be stopped quickly.

Further, the ratio of the winding radii $r_s/r_t$ is memorized at every turn, and if the changing rate of the ratio of the winding radii $r_s/r_t$ exceeds a predetermined threshold value, then it may be determined that the magnetic tape 7 is short and the speed reduction may be effected at an earlier timing.

Next, a technique for controlling the rotation in accordance with the winding amount of the tape when the cassette tape 2 is loaded in the VTR body 1 having the above-described construction will be described with reference to a flowchart of FIG. 2.

Figure 2:
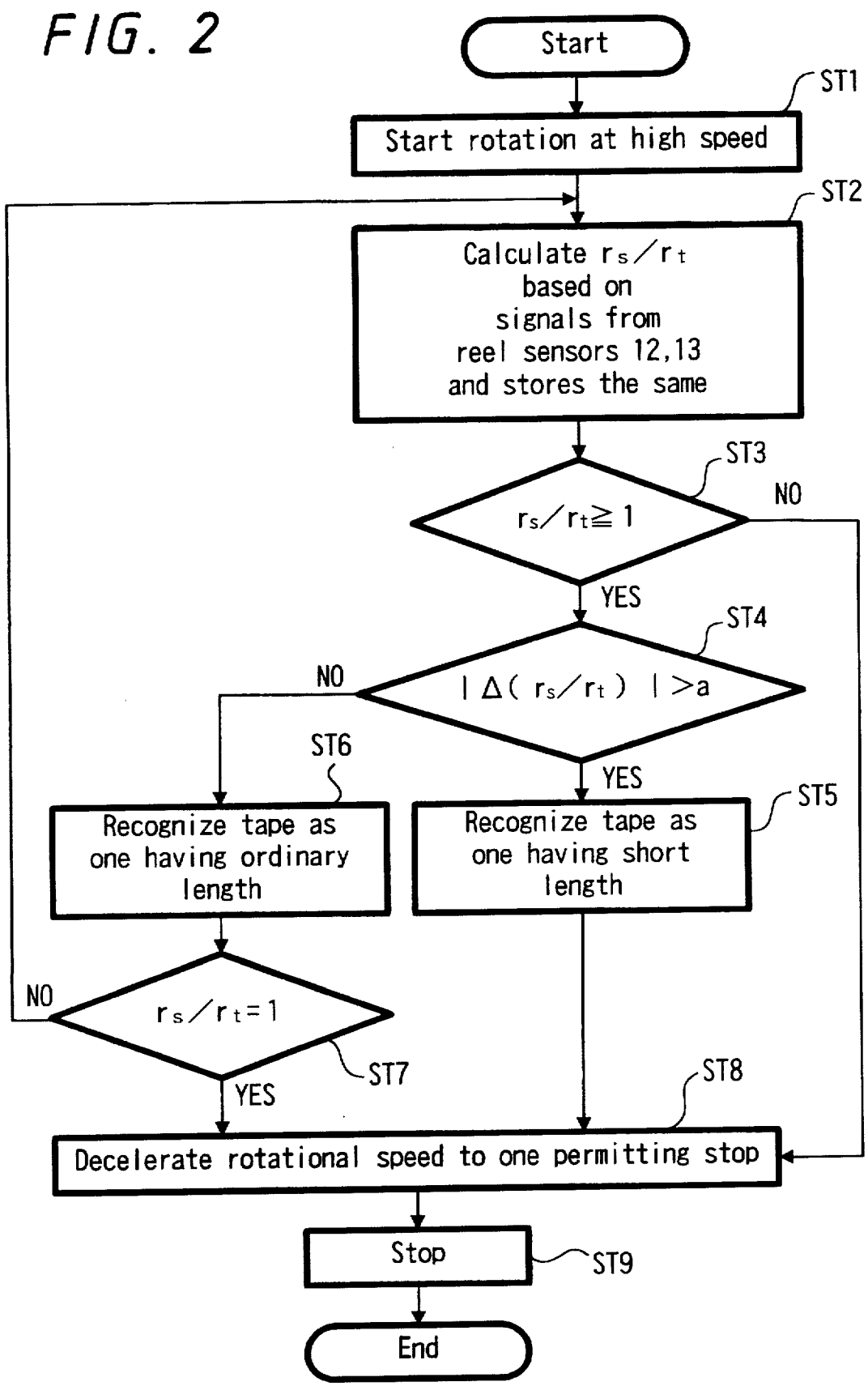
FIG. 2 is a flowchart showing a tape speed control method according to an embodiment of the present invention.

FIG. 2 is a flowchart useful for explaining a case in which the feed forward mode (FF) of the tape is set by the microcomputer 11.

When a user sets the cassette tape 2 into the VTR body 1 and pushes an FF button, not shown, only the reel stand 4 rotates actively at a high speed and the reel stand 4 rotatively drives the take-up reel 6 of the loaded tape cassette 2. When the take-up reel 6 is rotated to take-up the magnetic tape 7, then the supply reel 5 is dependently rotated by the transported magnetic tape 7. That is, the magnetic tape 7 is started to be transported at the high speed by the rotative drive of the take-up reel 6 (step ST 1).

When the high speed rotation is started, the microcomputer 11 calculates the ratio of the winding radius $r_t$ of the magnetic tape 7 around the supply reel 5 and the winding radius $r_t$ of the magnetic tape 7 around the take-up reel 6 on the basis of information of revolution of the reel stands 3, 4 detected by the reel sensors 12, 13, and then stores the information of the ratio therein (step ST2).

What should be noticed here is that, the relation between the winding radii $r_s$, $r_t$ changing in accordance with the wound amounts of the magnetic tape 7 around the supply reel 5 and the take-up reel 6 and the revolution rates of the reels 5, 6 is such that the smaller the winding radii $r_s$, $r_t$ become, the faster the reels 5, 6 are rotated. Specifically, since the fast forward mode (FF) is placed in this embodiment, the revolution rate of the take-up reel 6 is controlled by the capstan motor 10. However, since the supply reel 5 is rotated depending on the rotation of the take-up reel 6, the revolution rate of the reel 5 becomes faster when the remaining amount of the magnetic tape 7 around the supply reel 5 becomes little.

Therefore, if the winding radii $r_s$, $r_t$ become small, the revolution rate of the reel 5 dependently rotated by the magnetic tape 7 becomes large. Thus, the ratio of the winding radii $r_s$, $r_t$ of the tape, i.e., the ratio of the winding amounts of the tape can be calculated from the revolution rates of the reels 5, 6 detected by the reel sensors 12, 13.

Next, it is determined whether the ratio of the winding radii $r_s/r_t$ is greater than "1" or not, that is, whether or not the winding state of the tape 7 is in a range between the top state and the middle state (step ST3). If the ratio of winding radii $r_s/r_t$ is greater than "1", this fact means that the winding state of the magnetic tape 7 is placed between the top state and the middle state. Thus, the processing proceeds to step ST4. On the other hand, if the ratio of winding radii $r_s/r_t$ is smaller than "1", then it is determined that the state is in the range between the middle state and the end state, and the tape transporting speed is reduced to a speed which permits the magnetic tape 7 to be stopped quickly (stop ST8).

An absolute value of the changing rate $\Delta(r_s/r_t)$ of the ratio of winding radii $r_s/r_t$ during a predetermined period of time is compared with a predetermined threshold value a (step ST4). When the changing rate exceeds the threshold value a, then it is determined that the magnetic tape 7 is short, and the microcomputer 11 issues a command for reducing the tape transporting speed to a speed which permits the magnetic tape 7 to be stopped quickly (stop ST8).

If the absolute value of the changing rate $\Delta(r_s/r_t)$ does not exceed the threshold value a, then it is determined that the magnetic tape 7 has an ordinary length (step ST6), and then it is examined whether or not the ratio of the winding radii $r_s$ and $r_t$ becomes "1", i.e., whether or not the middle state is brought about (step ST7). If the state still does not become the middle state, the high revolution rate is maintained as it is.

When the magnetic tape 7 is rewound (REW), that is, the magnetic tape 7 is transported in the direction reverse to that in the FF mode, the tape transporting speed can be controlled on the basis of the determination, whether the ratio is smaller than "1" or not, which may be made at step ST3.

If the winding radii, or $r_s$ and $r_t$ become substantially equal to each other, or the ratio of the winding radii $r_s$ and $r_t$ becomes "1", then the transport speed of the magnetic tape 7 is reduced to a speed which permits the magnetic tape 7 to be stopped quickly (stop ST8). In any of the above cases, the capstan motor 10 is stopped to stop the magnetic tape 7 (step ST9).

Thus, the magnetic tape can be transported at a high speed and stopped without damage or the like regardless of the length of the tape.

Moreover, since it is unnecessary for a pinch roller to press against the magnetic tape, a sense of incongruity will not be caused in operation.

Furthermore, it is unnecessary to calculate the length of the tape by measuring the cross-sectional area of the roll of the magnetic tape 7. Therefore, the load imposed upon the microcomputer 11 can be reduced and the memory capacity thereof can be made small.

While the embodiment has been described with the VTR, a principle of the present invention can be applied not only to an equipment employing the magnetic tape but to an equipment utilizing a tape as a medium such as a cassette deck, a DAT (Digital Audio Tape recorder) deck, a DCC deck and so on. Further, it is needless to say that the present invention can be applied to a streamer tape, a magnetic tape for a β-system and so on.

As has been described above, according to the tape speed control method and its tape unit employing the method of the present invention, when one tape reel is rotatively driven, the winding radius is calculated in accordance with the revolution rate of the other tape reel which is dependently rotated by the transported tape, whereby the tape speed is controlled. Therefore, it is possible to save a capacity of the memory for calculating the cross-sectional area of the roll of the tape, and cost can be suppressed.

Further, in the FF/REW operation, the winding state is detected from the revolution rate of the tape reel which is dependently rotated by the transported tape. Therefore, the winding condition of the tape can be calculated so long as the tape reel is revolved. Accordingly, even if the tape is short, the speed reduction control can be accurately effected and the tape can be taken up smoothly.

Having described a preferred embodiment of the invention with reference to the accompanying drawings, it is to be understood that the present invention is not limited to that precise embodiment and that various changes and modifications could be effected therein by one skilled in the art without departing from the spirit or scope of the invention as defined in the appended claims.

What is claimed is:

1. A tape speed control method for controlling a speed of a tape transported between and wound around a supply reel and a take-up reel, comprising the steps of:

calculating a winding radius of the tape wound on the supply reel from a detected revolution rate of the supply reel that is dependently rotated by said transported tape when said take-up reel is rotatively driven to transport the tape;

calculating a winding radius of the tape wound on the take-up reel from a detected revolution rate of the take-up reel;

determining whether a ratio of the calculated supply reel winding radius and the calculated take-up reel winding radius is equal to or greater than 1 and, if not, controlling a rotative drive of said take-up reel to decelerate the tape to a stop permitting speed; and determining whether a rate of change of the ratio of the calculated supply reel winding radius and the calculated take-up reel radius is greater than a predetermined value and, if so, indicating that a length of the tape is less than a predetermined length;

controlling the rotative drive of said take-up reel to decelerate the tape to the stop permitting speed on the basis of an indicated length of the tape being less than a predetermined length;

when the rate of change of the ratio of the calculated supply reel winding radius and the calculated take-up reel winding radius is determined in said step of determining to be less than 1, indicating that the length of the tape is equal to the predetermined length and checking whether the ratio of the calculated supply reel winding radius and the calculated take-up reel winding radius is equal to 1 and, if so, controlling the rotative drive of said take-up reel to decelerate the tape to the stop permitting speed.

2. A tape unit comprising:

first and second tape reels;

a tape wound around said first and second tape reels;

rotative drive means for rotatively driving said second tape reel;

detecting means for detecting respective revolution rates of said first and second tape reels; and control means for calculating a tape winding radius of said first tape reel from the detected revolution rate of said first tape reel, for calculating a tape winding radius of said second tape reel from the detected revolution rate of said second tape reel, for determining whether a ratio of the calculated first tape reel winding radius and the calculated second tape reel winding radius is equal to or greater than 1 and, if not, controlling said rotative drive means of said second tape reel to decelerate the tape to a stop permitting speed, for determining whether a rate of change of the ratio of the calculated first tape reel winding radius and the calculated second tape reel winding radius is greater than a predetermined value to indicate whether a length of the tape is less than a predetermined length, and for controlling said driving of said second tape reel by said rotative drive means to decelerate the tape on the basis of an indication that the tape is less than the predetermined length, wherein when the rate of change of the ratio of the calculated first tape reel winding radius and the calculated second tape reel winding radius is determined by said control means to be less than 1, indicating that the length of the tape is equal to the predetermined length, said control means checks whether the ratio of the calculated first tape reel winding radius and the calculated second tape reel radius is equal to 1 and, if so, said control means controls said rotative drive means for said second tape reel to decelerate the tape to the stop permitting speed.

* * * * *

UNITED STATES PATENT AND TRADEMARK OFFICE
CERTIFICATE OF CORRRECTION

PATENT NO. : 5,912,781
DATED : June 15, 1999
INVENTOR(S) : Toshiaki Imai It is certified that error appears in the above-identified patent and that said Letters Patent is hereby corrected as shown below:

On title page, item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 4 | 6 | 2 | 0 | 2 | 4 | 1 | 10-28-'86 | Ono | | | |
| | | | | | | | | | | | | | |

Signed and Sealed this

Second Day of November, 1999

Attest:

Attesting Officer

Q. TODD DICKINSON

*Acting Commissioner of Patents and Trademarks*